US010440786B1

(12) United States Patent
Stoegner et al.

(10) Patent No.: US 10,440,786 B1
(45) Date of Patent: Oct. 8, 2019

(54) CONTROL CIRCUIT AND TECHNIQUES FOR CONTROLLING A LED ARRAY

(71) Applicant: Infineon Technologies AG, Neubiberg (DE)

(72) Inventors: Stefan Stoegner, Villach (AT); Christian Djelassi-Tscheck, Villach (AT); Tobias Giersch, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/981,627

(22) Filed: May 16, 2018

Related U.S. Application Data

(60) Provisional application No. 62/669,193, filed on May 9, 2018.

(51) Int. Cl.
*H05B 33/08* (2006.01)

(52) U.S. Cl.
CPC ..... *H05B 33/0827* (2013.01); *H05B 33/0887* (2013.01)

(58) Field of Classification Search
CPC ............ H05B 33/0827; H05B 33/0818; H05B 33/0815; H05B 33/0866; H05B 33/0869; H05B 33/0857; H05B 33/086; H05B 33/0872
USPC ........ 315/291, 312, 299, 307, 308, 149, 152
See application file for complete search history.

(56) References Cited

U.S. PATENT DOCUMENTS

| | | | |
|---|---|---|---|
| 6,351,079 B1 | 2/2002 | Willis | |
| 7,317,287 B2 | 1/2008 | Blumel | |
| 2004/0036418 A1 | 2/2004 | Rooke et al. | |
| 2006/0082332 A1* | 4/2006 | Ito | H05B 33/0815 315/291 |
| 2007/0195025 A1* | 8/2007 | Korcharz | G09G 3/3413 345/82 |
| 2008/0048573 A1* | 2/2008 | Ferentz | H05B 33/0815 315/193 |
| 2009/0021384 A1* | 1/2009 | Jacubovski | H05B 33/0827 340/653 |

(Continued)

FOREIGN PATENT DOCUMENTS

| | | |
|---|---|---|
| DE | 102006005521 B3 | 5/2007 |
| DE | 102008039526 A1 | 2/2010 |

(Continued)

*Primary Examiner* — Wei (Victor) Chan
(74) *Attorney, Agent, or Firm* — Shumaker & Sieffert, P.A.

(57) ABSTRACT

Devices and techniques for individual control of multiple light emitting diodes (LEDs) in a LED array. A LED array may include multiple strands of LEDs with each strand including a single LED or multiple LEDs. The techniques of this disclosure include a parallel approach to controlling a LED array with a current measurement circuit in each LED strand. The current measurement circuits may be selectable by a controller via a multiplexer (MUX). The arrangement of circuit elements provides for an improved initialization phase and operating phase and may achieve an accurate and substantially equal current at all LEDs. The current control may ensure a homogenous light output that accounts for process and production variability, as well as changes in operating conditions. A LED control circuit of this disclosure may also include system safety features including temperatures sensing, and over voltage and over current sensing and protection.

18 Claims, 7 Drawing Sheets

(56) References Cited

U.S. PATENT DOCUMENTS

| | | | |
|---|---|---|---|
| 2009/0079359 A1* | 3/2009 | Shteynberg | H05B 33/0818 |
| | | | 315/291 |
| 2009/0236994 A1* | 9/2009 | Deurenberg | H05B 33/0818 |
| | | | 315/152 |
| 2011/0080117 A1* | 4/2011 | Peker | G09G 3/3406 |
| | | | 315/297 |
| 2011/0148323 A1 | 6/2011 | Yao et al. | |
| 2011/0273104 A1* | 11/2011 | Uchimoto | G09G 3/3406 |
| | | | 315/210 |
| 2012/0146546 A1 | 6/2012 | Hu et al. | |
| 2012/0319603 A1 | 12/2012 | Moeller et al. | |
| 2013/0271019 A1 | 10/2013 | Tsai et al. | |
| 2015/0289336 A1 | 10/2015 | Cho | |
| 2018/0014370 A1* | 1/2018 | Wang | H05B 33/0815 |

FOREIGN PATENT DOCUMENTS

| | | |
|---|---|---|
| DE | 102010060857 A1 | 5/2012 |
| EP | 1449408 A1 | 8/2004 |
| GB | 2398682 A | 8/2004 |
| KR | 101192377 B1 | 10/2012 |
| WO | 2011107138 A1 | 9/2011 |
| WO | 2014053933 A1 | 4/2014 |

\* cited by examiner

CONTROL CIRCUIT AND TECHNIQUES FOR CONTROLLING A LED ARRAY

TECHNICAL FIELD

The disclosure relates to LED control circuits.

BACKGROUND

Light emitting diode (LED) arrays may be used for lighting in a variety of applications such as automobiles, interior living and working spaces, exterior lighting and similar applications. A LED array may also be called a LED matrix. Some examples of LED lighting systems include features such as individual control of multiple LEDs, which may include dimming and changing colors to respond to desired lighting output.

SUMMARY

In general, the disclosure is directed to devices and techniques for individual control of multiple light emitting diodes (LEDs) in a LED array. A LED array may include multiple strands of LEDs with each strand including a single LED or multiple LEDs. The techniques of this disclosure include a parallel approach to controlling a LED array with a current measurement circuit for each LED strand. The current measurement circuits for each LED strand may be selectable by a controller via a multiplexer (MUX). The arrangement of circuit elements in the techniques of this disclosure provide for an initialization phase and operating phase for the LED array that may have advantages over other examples of LED array control circuits. For example, the techniques of this disclosure may achieve an accurate and substantially equal current at all LEDs to ensure a homogenous light output and may adjust the current to compensate for component process and production variability, as well as changes in operating conditions. A LED control circuit of this disclosure may also include system safety features including temperatures sensing, and over-voltage and over-current sensing and protection.

In one example, the disclosure is directed to a LED array control circuit, the control circuit comprising: a plurality of output terminals, wherein each output terminal is configured to drive a LED strand of a LED array. The circuit further comprises a plurality of current measurement circuits, wherein each respective measurement circuit is configured to determine a magnitude of current for each respective output terminal, a plurality of switches, wherein: each switch is configured to control the magnitude of current for each respective output terminal, and each switch is configured to operate independently from any other respective switch of the plurality of switches, and a plurality of driver circuits comprising a plurality of current limiting circuits, wherein: a respective driver circuit of the plurality of driver circuits is configured to operate a respective switch of the plurality of switches each current limiting circuit of the plurality of current limiting circuits is associated with a respective switch of the plurality of switches, and each respective current limiting circuit of the plurality of current limiting circuits is configured to limit the magnitude of current for each respective output terminal to a respective predetermined current limit, wherein each respective predetermined current limit is independent from any other respective predetermined current limit.

In another example, the disclosure is directed to a system comprising: a LED array comprising a plurality of LED strands a LED control circuit operatively coupled to the LED array, a processor circuit operatively coupled to the LED control circuit, wherein the LED control circuit comprises: a plurality of output terminals, wherein each output terminal is configured to drive respective LED strand of a LED array, a plurality of current measurement circuits, wherein each respective measurement circuit is configured to determine a magnitude of current for each respective output terminal, a plurality of switches, wherein: each switch is configured to control the magnitude of current for each respective output terminal, and each switch is configured to operate independently from any other respective switch of the plurality of switches. The LED control circuit further comprises a plurality of driver circuits comprising a plurality of current limiting circuits, wherein: a respective driver circuit of the plurality of driver circuits is configured to operate a respective switch of the plurality of switches each current limiting circuit of the plurality of current limiting circuits is associated with a respective switch of the plurality of switches, and each respective current limiting circuit of the plurality of current limiting circuits is configured to limit the magnitude of current for each respective output terminal to a respective predetermined current limit, wherein each respective predetermined current limit is independent from any other respective predetermined current limit.

In another example, the disclosure is directed to a method for controlling a LED array, the method comprising, initializing, by a processor circuit, a LED control circuit, wherein initialization comprises: determining, by the processor circuit, an initial voltage for a LED array controlled by the LED control circuit, wherein the LED array comprises a plurality of LED strands and wherein the LED control circuit comprises a respective switch to operate each LED strand, activating, by the processor circuit, a voltage supply circuit to output the initial voltage to the LED array, activating, by the processor circuit, at least two switches controlling at least two respective LED strands of the plurality of LED strands, receiving, by the processor circuit, a respective magnitude of current for each activated LED strand of the plurality of LED strands, and receiving, by the processor circuit, a respective magnitude of voltage for each LED strand of the plurality of LED strands. In response to receiving the respective magnitude of voltage for each LED strand, determining, by the processor circuit, the LED strand with the highest magnitude of voltage, in relation to the remaining LED strands of the plurality of LED strands. In response to determining the LED strand with the highest magnitude of voltage, setting, by the processor circuit, the voltage supply circuit to output an operating voltage to the LED array, and in response to setting the operating voltage, determining, by the processor circuit, a pulse width modulation (PWM) scheme for each respective switch of each respective LED strand such that magnitude of current in each LED strand is approximately a predetermined magnitude of current, wherein each respective PWM scheme for each respective switch is set independently of the remaining switches of the plurality of switches.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure is directed to devices and techniques for individual control of multiple light emitting diodes (LEDs) in a LED array. A LED array may include multiple strands of LEDs with each strand including a single LED or multiple LEDs. The techniques of this disclosure include a parallel approach to controlling a LED array with a current measurement circuit for each LED strand. A LED strand may also be called a LED branch. The current measurement circuits for each LED strand may be selectable with a controller via a multiplexer (MUX). A controller may include a processor circuit such as a microprocessor or microcontroller (μC).

The arrangement of circuit elements in the techniques of this disclosure provide for an initialization phase and operating phase for the LED array that may have advantages over other examples of LED array control circuits. For example, the techniques of this disclosure may achieve an accurate and substantially equal current at all LEDs to ensure a homogenous light output. The LED array control circuit of this disclosure may overcome various challenges in LED array control. For example, because LED arrays may be subject to process and production variability, paralleling the LEDs of the LED array and simply connecting them to a common voltage source may result in unequal current in the parallel branches and an inhomogeneous light output. Also, LED arrays may operate in fluctuating conditions, such as changes in temperature.

In contrast, the techniques of this disclosure may have advantages over other LED control circuit examples, such as improved current read back for each LED strand as well as system protection in case of component failure or other issues. A current measurement circuit is included for each channel of the LED array control circuit controlling a LED strand. The current measurement circuit output may be sent to a controller via a MUX, which may reduce the complexity and duration of the initialization phase when compared to other examples. Additionally, the current measurement circuit allows a continuous check of active LEDs which enables much better diagnostic coverage and system protection (e.g. against short circuits), as well as a compensation of temperature effects on the LEDs. In some examples, the LED control circuit of this disclosure may detect temperature effects by the repetitive readout of the current per branch. The LED control circuit may adapt the supply voltage and/or the duty cycle of switches that control the current to each LED strand. In some examples, the LED control circuit may also include a temperature sensor for the switches that control the LED array. A LED control circuit may also be referred to as a LED array control circuit.

Figure 1:
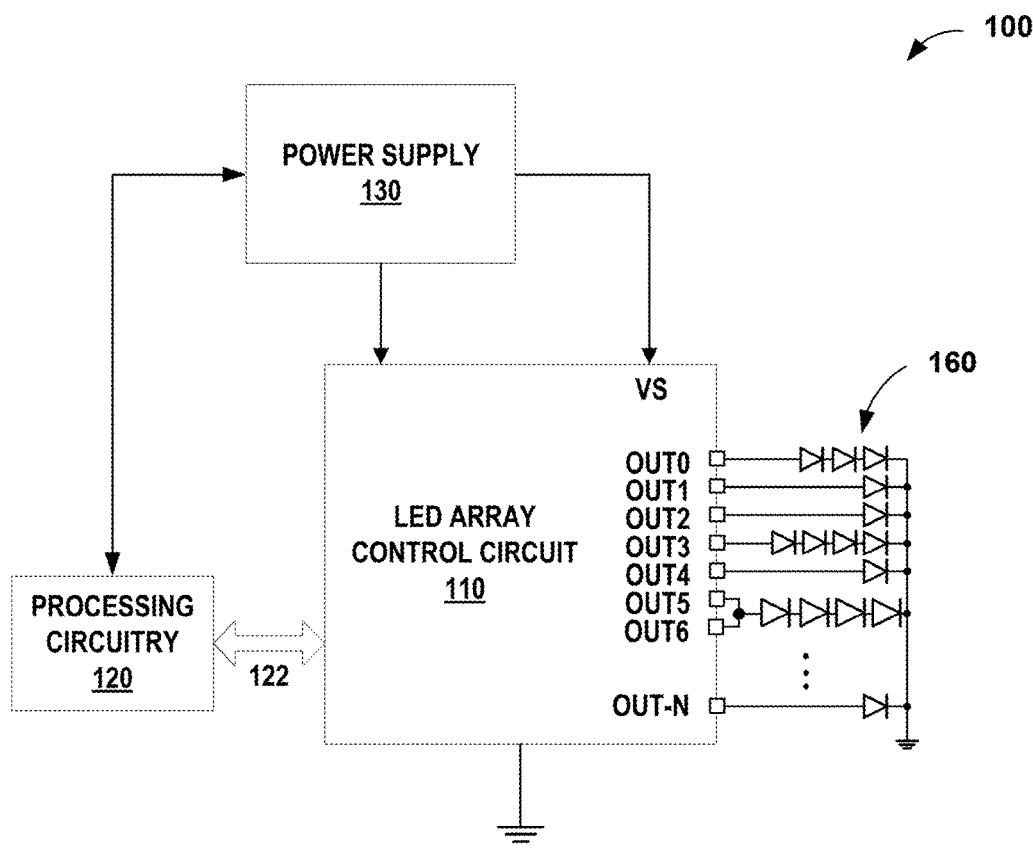
FIG. 1 is a block diagram illustrating an overview of an example system for controlling a light emitting diode (LED) array, according to one or more techniques of this disclosure.

FIG. 1 is a block diagram illustrating an overview of an example system for controlling a LED array, according to one or more techniques of this disclosure. System 100 may include processing circuitry 120 in communication with LED array control circuit 110 as well as with power supply 130.

LED array control circuit 110 may be adaptable to a variety of LED control applications. For example, LED array control circuit 110 may include both an input for digital communication with processing circuitry 120 as well as inputs for direct control of the LED arrays by processing circuitry 120 via communications path 122. LED array control circuit 110 may include N outputs (OUT0-OUT-N) for controlling up to N LED array 160. Each LED strand in LED array 160 may include one or multiple LEDs. In some examples a single output, e.g. OUT3, may drive a single LED strand. In other examples, multiple LED outputs may be used to drive a single LED strand. For example, OUT6 may be shorted to OUT5 which may provide additional current to a particular LED strand. In other examples, an output of LED array control circuit 110 may not be connected to any LEDs. In this disclosure a LED strand may also be referred to as a LED string or LED branch of LED array 160. Each respective output terminal OUT0-OUT-N and switch M0-MN of LED array control circuit 110 may be referred to as a channel. For example, channel 0 may comprise switch M0 and output terminal OUT0 and drive a LED strand of LED array 160

The circuitry for each output terminal OUT0-OUT-N of LED array control circuit 110 may include a switch configured to control the magnitude of current for each respective output terminal and operate independently from any other respective switch (not shown in FIG. 1). In some examples, the respective switches may control the magnitude of current using pulse width modulation (PWM), therefore the magnitude of current to a LED strand of LED array 160 may be described as an average current.

Each output terminal may also include a current measurement element to individually sense the magnitude of current for each respective output terminal. The current measurement element in each LED branch may be selectable by processing circuitry 120 via a multiplexer (not shown in FIG. 1). Processing circuitry 120 may determine the respective magnitude of current for each LED strand of LED array 160 by selecting the current measurement element for that branch via communication path 122. The current measurement element may also be referred to as a current sensor. LED array control circuit 110 may also include a current limiting circuit for each for each output terminal OUT0-OUT-N (not shown in FIG. 1).

LED array control circuit 110 may also include one or more temperature sensing elements (not shown in FIG. 1). In some examples, LED array control circuit 110 may include a separate temperature sensor associated with each respective output terminal. In other examples, LED array control circuit 110 may include a single temperature sensor for all output terminals, or temperature sensors for a group of outputs. For example, OUT0-OUT2 may be associated with a first temperature sensor while OUT3-OUT5 may be associated with a second temperature sensor.

Processing circuitry 120 may communicate with both LED array control circuit 110 and with power supply 130 to send and receive signals that may include both data and commands. In some examples, processing circuitry 120 may also receive signals from external sources, such as a temperature sensor that may provide an outside air temperature, or other types of sensors. Examples of processing circuitry 120 may include any type of processor circuit including one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. In the example of a vehicle, processing circuitry 120 may be an engine control unit (ECU) or may be in signal communication with an ECU, or other processors in the vehicle e.g. a computer on a single integrated circuit containing a processor core, memory, and programmable input/output peripherals.

Power supply 130 may provide electric power to drive the LED strands of LED array 160 in response to commands from processing circuitry 120. Commands from processing circuitry 120 may cause power supply 130 to adjust the magnitude of voltage and/or current from power supply 130 to terminal VS to power the LED strands. The operating voltage to terminal VS may also be referred to as the supply voltage. In some examples, power supply 130 may also provide power to support the operation of LED array control circuit 110 and processing circuitry 120. For example, power supply 130 may provide the power for the digital circuits (e.g. VDD) included in processing circuitry 120 and LED array control circuit 110. In other examples, support power for processing circuitry 120 and LED array control circuit 110 may come from a separate power supply in system 100 (not shown in FIG. 1).

In some examples, power supply 130 may be considered a voltage regulator. In other examples, power supply 130 may comprise a DC-to-DC converter in voltage mode configured to output voltages based on commands from processing circuitry 120. In other examples, power supply 130 may include a linear regulator, a switched mode power supply (SMPS) or other types of power supply that may provide a regulated output to LED array control circuit 110.

System 100, including LED array control circuit 110, may be used in applications such as controlling a LED array to turn on, turn off, or dim, when a given event occurs. In the example of a vehicle, processing circuitry 120 may receive a signal that a turn signal indicator is flashing. Processing circuitry 120 may cause LED array control circuit 110 to dim or turn off a LED array near the turn signal indicator to make the turn signal indicator more noticeable. Processing circuitry 120 may cause LED array control circuit 110 to adjust the brightness of a headlight or interior lighting of a vehicle, in response to a light sensor indicating sunrise, sunset or entering a tunnel. In some examples, LED array control circuit 110 may be used as an adaptive front beam for vehicles such as automobiles or motorcycles. In an alternative example of a use of the circuit within a building, processing circuitry 120 may receive an indication from a motion sensor, or another type of sensor, and in response to the indication, processing circuitry 120 may cause LED array control circuit 110 to activate or deactivate one or more strands of LED array 160.

In other examples, processing circuitry 120 may dim one or more strands of a LED array by reducing the average current to the LED strand, e.g. by causing LED array control circuit 110 to change the PWM scheme. LED array control circuit 110 may also control the overall brightness of LED array 160 either by changing the PWM scheme of some of the LED strands, while not changing the PWM scheme of other LED strands. Similarly LED array control circuit 110 may turn off one or more LED strands while leaving other LED strands turned on, to control the overall brightness.

In other examples, LED array control circuit 110 may change the output color of LED array 160 by individually controlling the brightness of one or more LED strands of LED array 160. For example, the LED strand connected to OUT0 may be a first color, e.g. red, while the LED strand connected to OUT3 may be a second color, e.g. blue.

In operation, LED array control circuit 110 may have advantages over other types of LED control circuits. As one example, the current measurement element in each LED branch that may selectable by processing circuitry 120 via a multiplexer may provide advantages during an initialization phase as well as during an operating phase. For example, the initialization phase may be less complex, when compared to other types of LED control circuits. Also, the duration of initialization phase may be tuned depending on the application and needs, e.g. fast start-up, minimize energy consumption, or other parameters.

In one example, power supply 130 may be configured to start with a voltage that is low enough to ensure current safely below the maximum ratings of the LEDs in LED array 160, then ramp the voltage up at a predetermined voltage increase rate. In the example of some white LEDs, the initial voltage may be approximately 2.5V. During the ramp up, LED array control circuit 110 may measure the current on each LED strand and output the current measurement to processing circuitry 120. Multiple or all LED strands may be activated simultaneously. In some examples, the voltage ramp up portion of the initialization phase may stop when all branches have reached at least a predetermined target current. The voltage may be therefore defined by the output voltage of the output terminal powering the LED strand with the highest forward voltage. The predetermined target current may be selectable based on the application, e.g. interior lighting, headlight, or similar application, which may include the types and number of LEDs in LED array 160.

LED array control circuit 110 may be configured to individually control a duty cycle of the PWM scheme for each of the respective switches for each output terminal OUT0-OUT-N such that the average current on all LED branches is approximately the same magnitude of current. In some examples LED array control circuit 110 may receive instructions to individually set the duty cycle for each output terminal, e.g. via digital communications on communication path 122. In other examples, processing circuitry 120 may directly control a drive circuit associated with each respective switch and output terminal to control the PWM scheme.

During an operating phase, LED array control circuit 110 may continuously check the active LED strands of LED array 160, which may enable improved diagnostic coverage and system protection (e.g. against short circuits). Similarly, individual control of each LED strand allows for compensation of temperature effects of the LEDs, which is desirable in some applications. As temperature changes, the performance of a LED may change, and therefore, the voltage output by power supply 130 and/or the duty cycle of the PWM scheme may need to be adjusted to compensate for the performance change. The temperature effects may be determined by the repetitive readout of the magnitude of current (average current) in each respective LED branch, thus, processing circuitry 120 may adapt the supply voltage and/or the duty cycle of the switches. In some examples, functions within LED array control circuit 110 may also be configured to adapt the duty cycle of the switches to adjust the magnitude of current.

In some examples, LED array control circuit 110 may include a variable or fixed resistance in each branch/output terminal to further control the current balancing between the LED branches. A variable resistance may be one example technique to lower the current peaks on the LED strand with the lowest forward voltage.

Because the LED array control circuit of this disclosure includes current measurement in each LED branch and a multiplexor to output information, the LED array control circuit of this disclosure may have enhanced functionality and advantages when compared to other types of LED control circuits. For example, one possible way to control individual LEDs, including dimming, is to put the LEDs in one string and short each LEDs with a switch to make each one individually controllable. Individual switches on a single string may have the disadvantage of less control over the voltage and current in the single string. Another way to control individual LEDs is to put LEDs in parallel and control each path with switches or linear current sources. In some examples that use the parallel approach with current sources for each LED string in combination with a voltage source may have low efficiency because of power loss in the current sources.

Other examples of the parallel approach may include examples that use a voltage source and switches with a single current measurement element for the entire LED array. A single current measurement element may require complex initialization of the LED array system, such as initializing a first strand, then turning off the first strand before initializing a second strand, and so on. Additionally, a single current measurement element offers limited diagnosis during operation, e.g. system diagnostics, and the system may have slow reaction time in the case of a short circuit in one of the LED strings. The limited diagnostics may also lead to a forward voltage shift that affects the current at a certain voltage because of change of temperature of LEDs caused by activation, or the environment. Some examples of LED control systems with limited diagnostics may not be able to monitor current or temperature during operation, but only during initialization.

In contrast, LED array control circuit 110, according to one or more techniques of this disclosure may provide a less complex and customizable initialization phase. Additionally, during the operation phase, LED array control circuit 110 may provide a continuous check of active LEDs, better diagnostic coverage and system protection from short circuits and over voltage, as well as a compensation of temperature effects of the LEDs. In case of a short circuit or high average current on a LED strand, the current limiter may activate and protects the system, for example either by shutdown or reducing the average current. In case of open load (e.g. a LED that is damaged or destroyed) the current is almost zero therefore the individual current measurement for the LED strand may detect the failure enabling the system to report the short and react accordingly. Some example reactions may be to output an alarm or notification, adjust the current or voltage to compensate for the short circuit, or other similar reactions. Therefore, a current limiter of this disclosure is different than limiting current, for example with a resistor.

In some examples, heating of a single LED or LED strand may be recognized by comparing the initial current and voltage on the regulator to the most recent current and voltage. When a LED heats up at a constant current, the LED forward voltage may decrease. Similarly, for a constant forward voltage, as temperature increases, the LED current may also increase. By measuring an increased current (compared to the initial value) a temperature change may be determined, e.g. by processing circuitry 120.

Figure 2:
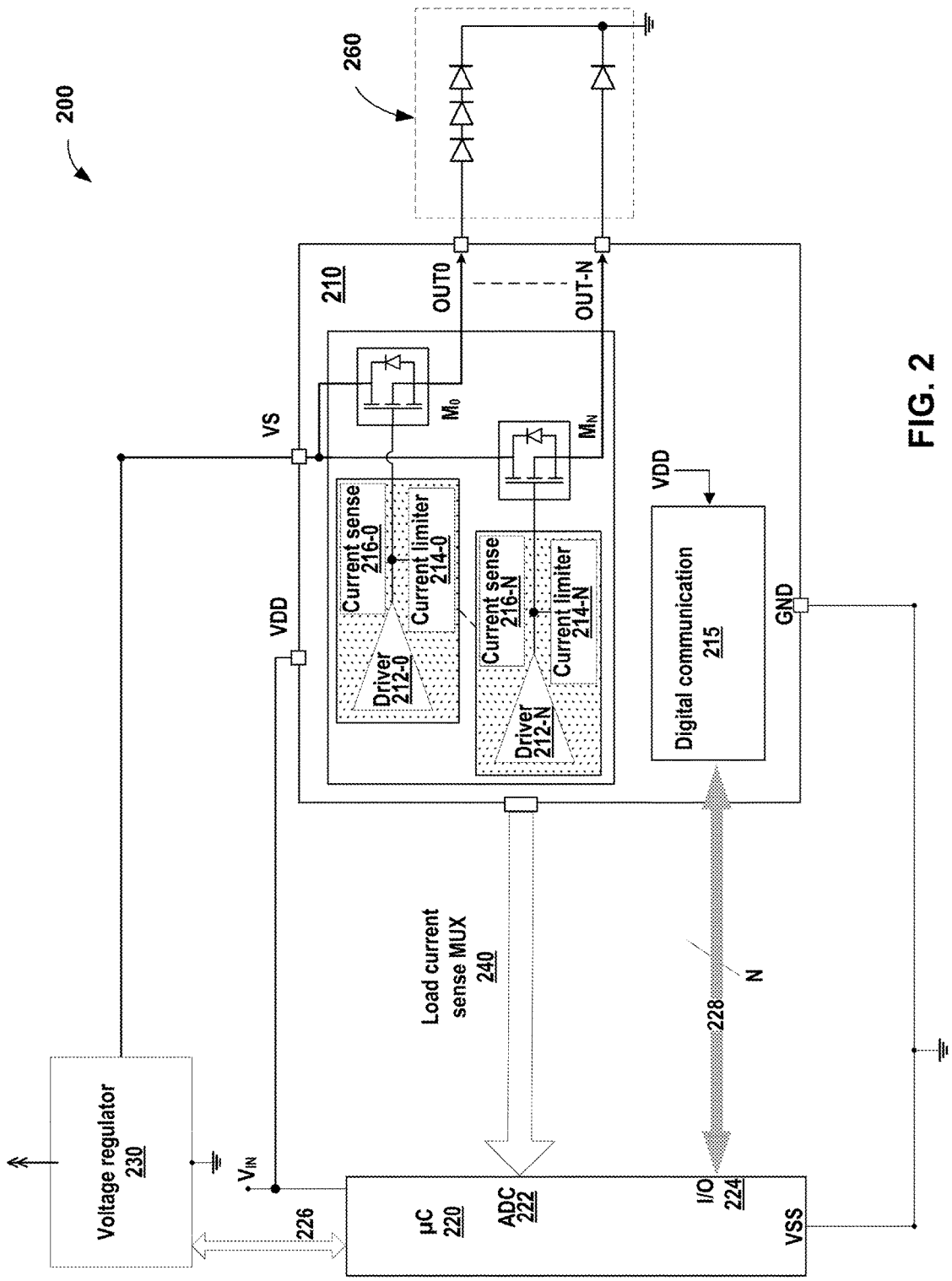
FIG. 2 is a block diagram illustrating an example system for controlling a LED array that includes a multichannel integrated high side switch with digital communication circuitry.

FIG. 2 is a block diagram illustrating an example system for controlling a LED array that includes a multichannel integrated high side switch with digital communication circuitry. System 200 includes more detailed examples of a LED array control circuit, power supply and processor circuitry, similar to LED array control circuit 110, power supply 130 and processing circuitry 120 described in relation to FIG. 1, and have the same functions and advantages, unless otherwise specified.

System 200 may include microcontroller (μC) 220 in communication with LED array control circuit 210 as well as with voltage regulator 230. As with system 100, system 200 may provide individual control of multiple LED strands in LED array 260, including dimming. System 200 may achieve an accurate and equal current at all LEDs, which may ensure a homogenous light output. Individual control of the current in each LED strand compensates for variation in the forward voltage of LEDs, which may be subject to production spreading as well as temperature dependency. The techniques included in system 200 may also avoid overshoots in current and/or voltage during the load changes and improved current accuracy when compared to other types of LED control circuits. System 200 follows the parallel approach described above for system 100, and provides current read back for each LED as well as system protection.

Microcontroller 220 may include an analog-to-digital converter (ADC) input 222, digital input/output (I/O) 224, power and communication connection 226 to voltage regulator 230, as well as other connections, such as to VIN, ground (VSS) or other connections not shown in FIG. 2. Some other connections may include data communication to other portions of a larger system, such as an ECU, a user interface, outputs to alarms or notifications and similar connections. As with processing circuitry 120 described above in relation to FIG. 1, microcontroller 220 is just one example of a type of processing circuit that may be used to communicate with and control LED array control circuit 210. In some examples, microcontroller 220 may communicate with LED array control circuit 210 via digital I/O 224 and omit ADC 222 or leave ADC 222 unconnected.

As with power supply 130 described in relation to FIG. 1, voltage regulator 230 may adjust one or more output voltages, or currents, in response to commands from microcontroller 220. For example, during an initialization phase, in response to microcontroller 220 determining the LED strand with the highest magnitude of voltage, voltage regulator 230 may output an operating voltage, as commanded by microcontroller 220 to the VS input terminal of LED array control circuit 210. The operating voltage to terminal VS may also be referred to as the supply voltage. In some examples voltage regulator 230 may provide the VIN to microcontroller 220. In other examples, VIN for microcontroller 220 may be provided by another power supply not shown in FIG. 2. Voltage regulator 230 may also be referred to as a voltage supply circuit.

LED array control circuit 210 may configured to drive the LED strands of LED array 260 to maintain approximately equal current in each strand as well as provide protection from over temperature, over voltage and over current. LED array control circuit 210 may include multiple outputs OUT0-OUT-N, as well as circuits associated with each output OUT0-OUT-N, such as current measurement circuits 216-0-216-N, multiple switches M0-MN, driver circuits 212-0-212-N, and current limiting circuits 214-0-214-N. LED array control circuit 210 may also include digital communication circuit 215 and MUX output 240. In some examples, the components of LED array control circuit 210 may be incorporated on a single integrated circuit. In the example of FIG. 2, output terminal OUT0 connects to a three-LED strand of LED array 260. Output terminal OUT-N connects to a LED strand with a single LED.

Driver circuits 212-0-212-N (collectively driver circuits 212) may be configured to operate a respective switch of switches M0-MN that control the current to each LED strand in LED array 260. For example, a respective driver circuit may drive the gate of a respective switch, in examples where switches M0-MN are metal oxide field effect transistors (MOSFET) or a similar type of switch with a gate terminal. Though current measurement circuits 216-0-216-N (collectively current measurement circuits 216) and current limiting circuits 214-0-214-N (collectively current limiting circuits 214) are shown as separate blocks in FIG. 2, in some examples driver circuits 212 may include current measurement circuits 216 and current limiting circuits 214. Current measurement circuits 216 may also be referred to as current sense circuits 216. Current limiting circuits 214 may provide advantages over limiting current in a respective channel by other techniques, such as simply adding a resistor to each channel. For example, a resistor would dissipate energy throughout the circuit operation and may therefore be less efficient then current limiting circuits 214 of this disclosure. Other advantages may include the ability to limit the current to a predefined value. Current limiting circuits 214 would maintain the current limit as the voltage changes. A resistor would limit to a fixed current only if the voltage is unchanged. In some examples, a variable resistance may be added to one or more branches of LED array control circuit 210 in addition to current limiting circuits 214, depending on the application, as described above in relation to FIG. 1.

In some examples, driver circuits 212 may output a PWM scheme as programmed by digital communication circuit 215. For example, after the initialization phase, microcontroller 220 may determine the operating point (output voltage and current) for output terminal OUT0 and calculate a first PWM scheme with a first duty cycle. Digital communication circuit 215 may receive a signal from microcontroller 220 to set driver circuit 212-0 to cause switch M0 to operate under the first duty cycle. Thereafter, unless reprogrammed, driver circuit 212-0 may output the first PWM scheme with the first duty cycle. In other examples, driver circuit 212-0 only output a PWM scheme with a given duty cycle under direct, continuous control of digital communication circuit 215.

Each switch M0-MN may be configured to control the magnitude of current for each respective output terminal. In the example of FIG. 2, switch M0 connects the VS terminal of LED array control circuit 210 to output terminal OUT0. Driver circuit 212-0 may send a PWM signal to the gate of switch M0, which controls the average current delivered to output terminal OUT0. The remaining switches connect the VS terminal of LED array control circuit 210 to the respective output terminal and control current to each output terminal in a similar manner. Each switch M0-MN may be configured to operate independently from any other respective switch of the plurality of switches. The VS terminal of LED array control circuit 210 receives power (voltage and current) from the power supply, voltage regulator 230.

Each of driver circuits 212 may include an associated current limiting circuit for each output terminal OUT0-OUTN and switch M0-MN. Each respective current limiting circuit of current limiting circuits 214 may be configured to limit the magnitude of current for each respective output terminal OUT0-OUTN to a respective predetermined current limit. Each respective predetermined current limit set for a current limiting circuit is independent from any other respective predetermined current limit set for a different current limiting circuit. For example, the predetermined current limit for current limiting circuit 214-0 may be different that the predetermined current limit for current limiting circuit 214-5 (not shown in FIG. 2). In some examples, current limit circuits 214 do not change the duty cycle. The duty cycle may be adapted to achieve a predefined average current. Current limiting circuits 214 may protect the LEDs from damage, i.e. to ensure the LED specific maximum current should not be reached.

An IC including the LED array control circuit of this disclosure may be configured by a user to operate differently depending on a particular application. For example, in an application with digital communication capability, digital communication circuit 215 may be configured to program or set the respective current limit for a respective current limiting circuit. During operation, the current limiting circuit may operate independently to limit the current associated with a respective output terminal and switch, i.e. without further input from digital communication circuit 215 or microcontroller 220. For example, digital communication circuit 215 may program current limiting circuit 214-0 to a predetermined limit of 120 mA. Current limiting circuit 214-0 may then monitor the current through switch M0, e.g. via current sense circuit 216-0, and adjust the PWM scheme of driver 212-0 to reduce the average current to output terminal OUT0 as needed. In some examples, a current limiting circuit 214 may limit the magnitude of the current by triggering one or more of driver circuits 212 to turn off the respective switch connected to the driver circuit.

In other examples, digital communication circuit 215 may monitor the current through switch M0, e.g. via current sense circuit 216-0, and directly control current limiting circuit 214 to reduce the average current to output terminal OUT0 as needed. In other examples, digital communication circuit 215 may communicate with microcontroller 220 via digital I/O path 228 and receive commands from microcontroller 220 to cause current limiting circuit 214-0 and driver 212-0 to reduce current to output terminal OUT0 when the current through switch M0 nears, or exceeds, the predetermined current threshold. Similarly, microcontroller 220 may monitor the current to each output terminal, e.g. via current sense circuits 216 and load current sense MUX output terminal 240 and may directly control or send commands to digital communication circuit 215 to control, the PWM scheme of the associated driver circuit with a magnitude of current that nears or exceeds the predetermined threshold.

In other examples microcontroller 220 may provide a target value for an average output current and a maximum output current to LED array control circuit 210. To achieve this average current, LED array control circuit 210 may internally determine a PWM scheme and monitor the current with current measurement circuits 216. LED array control circuit 210 may also internally set current limiting circuits 214 to the provided maximum output current value from microcontroller 220. In other examples, LED array control circuit 210 may determine that the set average current on the LED(s) cannot be achieved and directly feeds back to microcontroller 220 that the output voltage from voltage regulator 230 should be increased. In other examples, LED array control circuit 210 may determine that the voltage from voltage regulator 230 is too high (e.g. from a low duty cycle on all LED strings or because of the set current limit). LED array control circuit 210 may directly feed back to the microcontroller 220 that the output voltage from voltage regulator 230 should be decreased.

In some examples digital communication circuit 215 may operate using a serial peripheral interface bus (SPI) via digital I/O path 228. SPI is a synchronous serial communication interface specification used for short distance communication, primarily in embedded systems. The SPI bus specifies four logic signals: SCLK: serial clock (output from a master), MOSI: master output slave input, or master out slave in (data output from master), MISO: master input slave output, or master in slave out (data output from slave) and SS: slave select (which may be active low, output from master). In other examples, alternative pin naming conventions may be used. In some examples, SPI may be called a four-wire serial bus, contrasting with three-, two-, and one-wire serial buses. The SPI may be described as a synchronous serial interface, but it is different from the Synchronous Serial Interface (SSI) protocol, which is also a four-wire synchronous serial communication protocol. SSI Protocol employs differential signaling and provides only a single simplex communication channel. In other examples, digital communication circuit 215 may use other standard interface protocols, or a custom protocol.

The predetermined threshold for each output terminal OUT0-OUT-N may be set by a user based on application. For example, LED array control circuit 210 may operate a LED array, e.g. LED array 260, with a variety of LEDs that have different maximum current limitations. In an automotive application, LED array 260 may include one or more strands of LEDs for running lights, one or more strands for low beam and, additional strands for high beam headlights, along with other LED strands. The running light LEDs may have a different maximum current limit than the LEDs used for the headlights. Therefore, the predetermined current limit associated with the running light output terminals may be different than the predetermined current limit associated with the headlight output terminals.

Voltage regulator 230 and microcontroller 220 may start up LED array 260 with an initialization phase, as described above in relation to FIG. 1. That is, microcontroller 220 may configure voltage regulator 230 to start with a voltage that is low enough to ensure current safely below the maximum ratings of the LEDs in LED array 260, then ramp the voltage up at a predetermined voltage increase rate. The voltage ramp portion of the initialization phase may stop when all branches have reached at least a predetermined target current. Similar to the predetermined current limit described for current limiting circuits 214, a user may set the predetermined target current for each output terminal OUT0-OUT-N connected to each strand of LED array 260. In some examples, microcontroller 220 may be programmed with the predetermined target current. In other examples, digital communication circuit 215 or driver circuits 212 may be configured with the predetermined target current.

System 200 may switch from initialization phase to operating phase, such as when all LED strands of LED array 260 have reached the target current. LED array control circuit 210 may then adjust the operating current as needed to compensate for temperature changes, heating effects of current through the switches and LED strands, changes in commands from other systems outside of system 200, e.g. a command to turn on headlights when entering a darkened tunnel.

Figure 3:
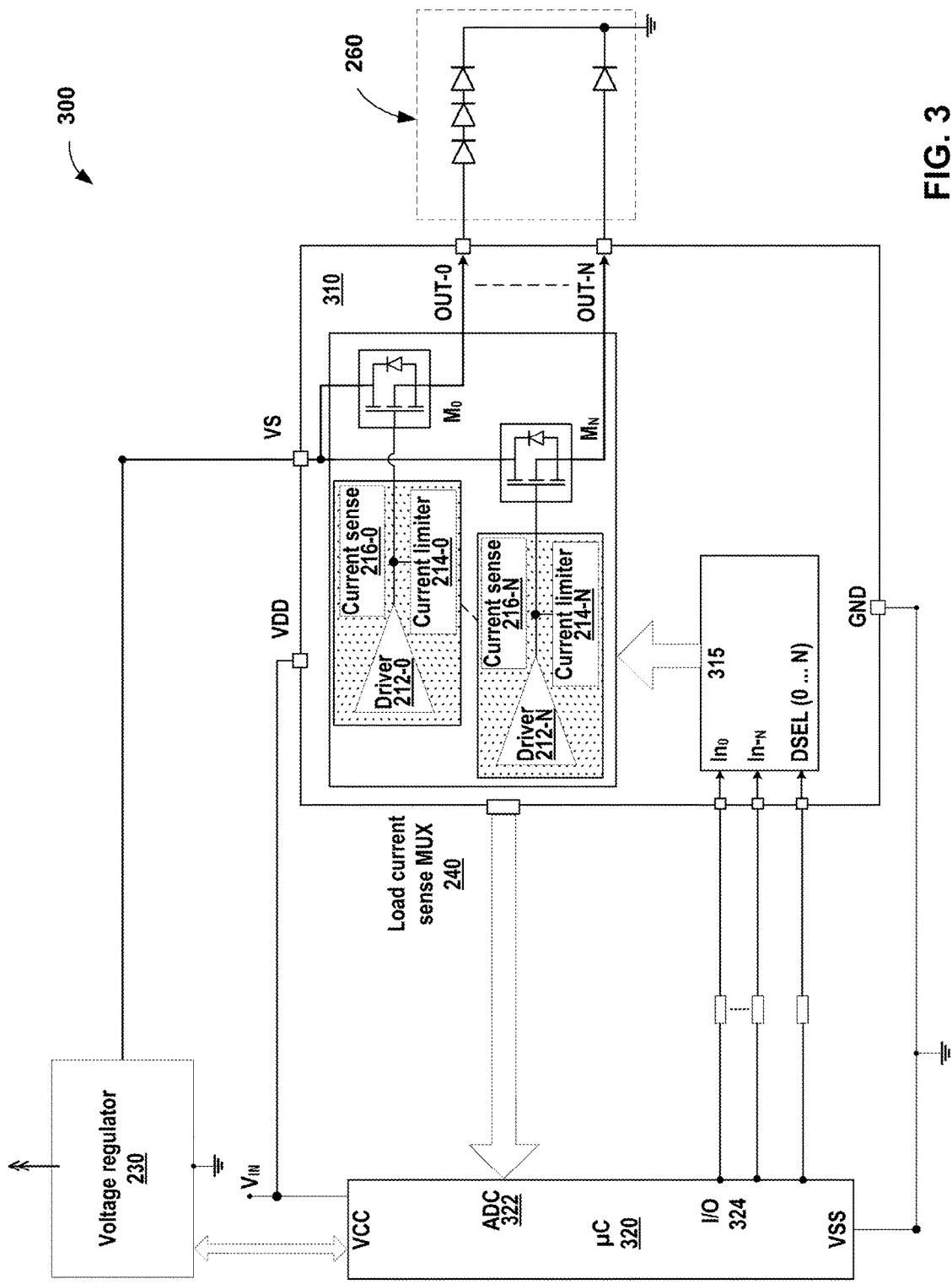
FIG. 3 is a block diagram illustrating an example system for controlling a LED array that includes a multichannel integrated high side switch driven via individual input pins for each LED strand.

FIG. 3 is a block diagram illustrating an example system for controlling a LED array that includes a multichannel integrated high side switch driven via individual input pins for each LED strand. In some examples an IC with a LED array control circuit, such as LED array control circuit 210 or LED array control circuit 310 may include both a digital communication interface and individual input pins for each LED strand. Depending on the application, either interface may be used. For example, in a system without a digital communication capability, a LED array control circuit may communicate with the processing circuitry via the individual input pins for each LED strand, as shown in system 300, and any digital interface may remain disconnected.

As with system 200 described above in relation to FIG. 2, system 300 includes more detailed examples of a LED array control circuit, power supply and processor circuitry, similar to system 100 described in relation to FIG. 1. LED array control circuit 310 has the same functions and advantages as LED array control circuit 210 and LED array control circuit 110, unless otherwise specified. For example, driver circuits 212, current limiting circuits 214, current sense circuits 216, switches M0-MN, and output terminals OUT0-OUT-N perform as described above in relation to FIG. 2. Similarly, LED array 260, voltage regulator 230 and load current sense MUX output terminal 240 perform as described above in relation to FIG. 2. System 300 includes similar connections to power and ground as with system 200, e.g. VIN, VS and VSS.

LED array control circuit 310 may receive a PWM scheme for each respective output terminal OUT0-OUT-N at interface 315 from I/O 324. Each input terminal $In_0$-$In$-$_N$ may receive a separate PWM scheme that controls the current in each channel via driver circuits 212 and switches M0-MN. Each PWM scheme for each channel may be independent of the PWM scheme for any other channel.

LED array control circuit 310 may output the sensed current for each respective channel to ADC port 322 of microcontroller 320 via load sense MUX output terminal 240. microcontroller 320 may cycle through the active channels, or all channels, of LED array control circuit 310 to periodically determine the current for each channel associated with each output terminal OUT0-OUT-N. In some examples, microcontroller 320 may select which channel to monitor by sending a signal to interface 315 via the select pin, DSEL. In other words, the MUX circuit of LED array control circuit 310 may be configured to receive information from each driver circuit 212-0-212-N output the information at the load current sense terminal 240 in response to the signal received at DSEL. The information output at the sense terminal 240 comprises a respective magnitude of current (e.g. average current) for a respective output terminal OUT0-OUT-N. As described above, current sense circuits 216 may be separate, or integrated into driver circuits 212.

In some examples, microcontroller 320 may monitor each of current sense circuits 216 and adjust the PWM scheme to limit the current of a channel that may be getting near or exceeding the predetermined current limit. In other examples, LED array control circuit 310 may control the duty cycle of the PWM scheme to limit the output current to the LED strands. In other examples, microcontroller 320 may individually set a current limit for each of current limiting circuits 214, which may then operate to limit the current for each channel without further input from microcontroller 320. In other examples, each current limiting circuit 214-0-214-N may be pre-programmed with a separate predetermined current limit for each channel. For example, during manufacturing assembly, a programming function, such as during circuit testing, may pre-program each current limiting circuit of current limiting circuits 214, depending on the expected application. LED array control circuit 310 may retain these current limits during operation once assembled into a final product.

Figure 4:
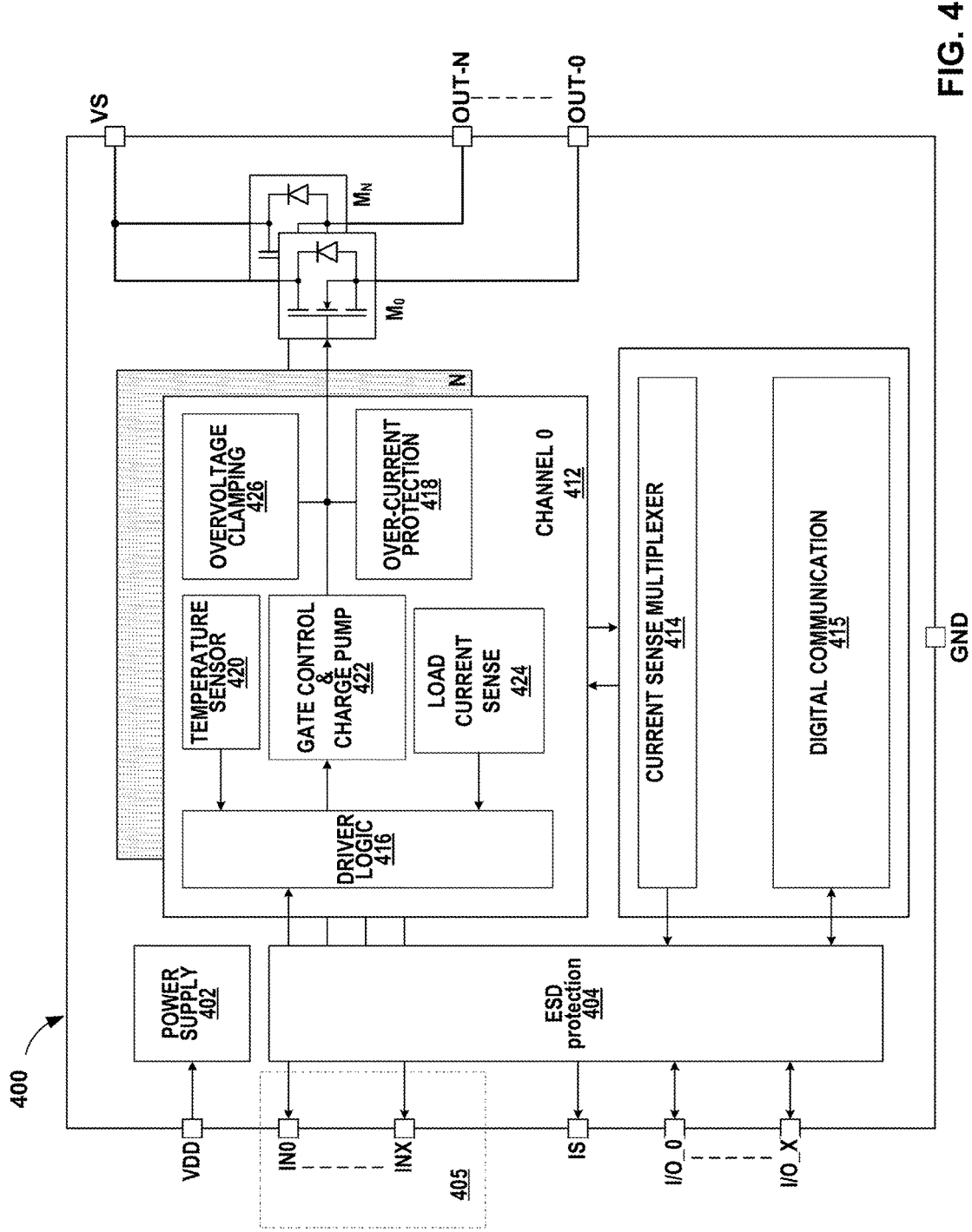
FIG. 4 is a block diagram illustrating an example multi-channel integrated high side switch circuit with digital communication circuitry.

FIG. 4 is a block diagram illustrating an example multi-channel integrated high side switch circuit with digital communication circuitry. LED array control circuit 400 of FIG. 4 illustrates additional details of an example LED array control circuit such as LED array control circuit 210 and LED array control circuit 310 depicted in FIGS. 2 and 3. LED array control circuit 400 includes digital communication circuit 415, which is similar to LED array control circuit 210. However, as described above in relation to FIGS. 1 and 3, an IC with a LED array control circuit, such as LED array control circuit 400 may include both a digital communication interface 415 and individual input pins 405 for each LED strand.

Similar to LED array control circuits 210 and 310, described above in relation to FIGS. 2 and 3, LED array control circuit 400 includes switches M0-MN that connect output terminals OUT0-OUT-N to the VS terminal. The VS terminal may connect to a power supply, such as power supply 130 depicted in FIG. 1 and provide the power for a LED array connected to output terminals OUT0-OUT-N. Each switch M0-MN may be configured to control the magnitude of current for each respective output terminal, and to operate independently from any other respective switch. In some examples, the switches, as driven by the driver circuits, may control the magnitude of current based on the duty cycle of a PWM scheme.

In the example of FIG. 4, LED array control circuit 400 also includes power supply portion 402, ESD protection 404, digital communication 415, and current sense MUX 414. LED array control circuit 400 includes driver circuits channel 0 through channel N. Example driver circuit 412, for channel 0, further includes driver logic 416, temperature sensor 420, gate control and charge pump circuit 422, load current sensor circuit 424, overvoltage clamping circuit 426, and over-current protection circuit 418. In other examples, LED array control circuit 400 may also include more or few components than depicted in FIG. 4. In some examples, driver logic 416 may control the duty cycle of switch M0 via gate control and charge pump circuit 422.

Gate control and charge pump circuit 422 may use a form of switching device to control the connection of a supply voltage across a load through a charge storage device, such as a capacitor. Gate control and charge pump circuit 422 may scale the voltage to the gates of switches M0-MN.

Power supply portion 402 connects to VDD, which may be further connected to a system power supply, such as voltage regulator 230 described above in relation to FIGS. 2 and 3. Power supply portion 402 may act as a DC-to-DC converter and provide one or more voltage sources, such as a reference voltage (e.g. Vref), to operate the components of LED array control circuit 400. In some examples the components of LED array control circuit 400, such as driver circuit 412 and digital communication 415 may operate at different voltage levels from each other.

ESD protection circuit 404 may include clamping circuits, filtering circuits and similar circuits to protect the components of LED array control circuit 400 from electrostatic discharge (ESD) and other types of electromagnetic interference (EMI). ESD protection circuit connects between the digital communication interface 415 and individual input pins 405 as well as the load current sense terminal, IS. Load current sense terminal, IS, is similar to load current sense terminal 240 described above in relation to FIGS. 2 and 3. Digital communication interface 415 and individual input pins 405 as well as the load current sense terminal, IS may connect to processing circuitry such as processing circuitry 120 and microcontroller 220 and microcontroller 320 depicted above in FIGS. 1-3. Digital communication interface 415 functions as described above for digital communication circuit 215 in relation to FIG. 2.

Over-current protection circuit 418 functions as described above for current limiting circuit 214 described in relation to FIGS. 2 and 3 to protect the LEDs in the output array, as well as other components of LED array control circuit 400, from damage caused by excess current. In some examples, over-current protection circuit 418 may be configured to output a signal indicating an over-current status via digital communication circuit 415. In some examples, over-current protection circuit 418 may cause driver logic 416 to reduce the duty cycle, or to completely turn off the respective switch, e.g. switch M0.

Over voltage clamping circuit 426 may monitor the voltage at output terminal OUT0 to protect the connected LED strand at channel 0 from excess voltage. Each channel, e.g. channel 0-channel N, may include a similar overvoltage protection circuit.

Temperature sensor 420 may monitor the temperature of the components of channel 0, including driver circuit 412 and switch M0. In some examples, each channel may include a similar temperature sensor circuit. In some examples temperature sensor 420 may provide an input to driver logic 416 that may cause driver logic 416 to adjust the duty cycle of switch M0 in response to a change in temperature. For example, if the temperature exceeds a threshold, the signal from temperature sensor 420 may cause driver logic 416 to reduce current by changing the duty cycle, or by turning off switch M0. In some examples, driver logic 416 may increase the duty cycle, or turn on switch M0 if the temperature reduces below the threshold.

In other examples, processing circuitry, such as microcontroller 220 depicted in FIG. 2, may be configured to receive a signal from LED array control circuit 400 comprising the temperature of a respective switch for a LED strand. For example, digital communication circuit 415 may receive the signal from temperature sensor 420 and send the signal the processing circuitry. The processing circuitry may determine whether the temperature exceeds a threshold temperature. In response to determining that the temperature exceeds a threshold temperature, the processing circuitry may send a signal to LED array control circuit 400 to open the respective switch to turn off the respective LED strand, or to adjust the duty cycle to reduce the current at the respective output terminal. The example of FIG. 4 depicts a temperature sensor, e.g. temperature sensor 420, for each channel of LED array control circuit 400. In other examples, as described above in relation to FIG. 1, a LED array control circuit may have a single temperature sensor, or a temperature sensor for a group of channels.

Similarly, load current sense circuit 424 may monitor the current in channel 0 and each channel may include a similar load current sense circuit. Load current sense circuit 424 operates similar to current sense circuits 216, described above in relation to FIGS. 2 and 3. Load current sense circuit 424 may determine the current at through switch M0 and output a signal to driver logic 416. Driver logic 416 may cause the duty cycle for switch M0 to change as needed in response to the signal from load current sense circuit 424. In some examples driver logic 416 may also output the signal including the sensed current to current sense MUX 414. As described above in relation to FIG. 1, a separate load current sense circuit for each channel, e.g. load current sense circuit 424, may provide advantages for a LED array control circuit according to this disclosure, such as improved current accuracy.

Current sense MUX 414 functions similar to current sense MUX output terminal 240 described above in relation to FIGS. 2 and 3. Current sense MUX 414 may receive the magnitude of current for each channel of LED array control circuit 400 and output the information to a processer circuit via sense terminal IS. In some examples current sense MUX 414 may receive a signal from the processor circuit to select a particular channel, determine the magnitude of current, including the average current, peak current, and similar values, and output the information at the sense terminal IS.

Figure 5:
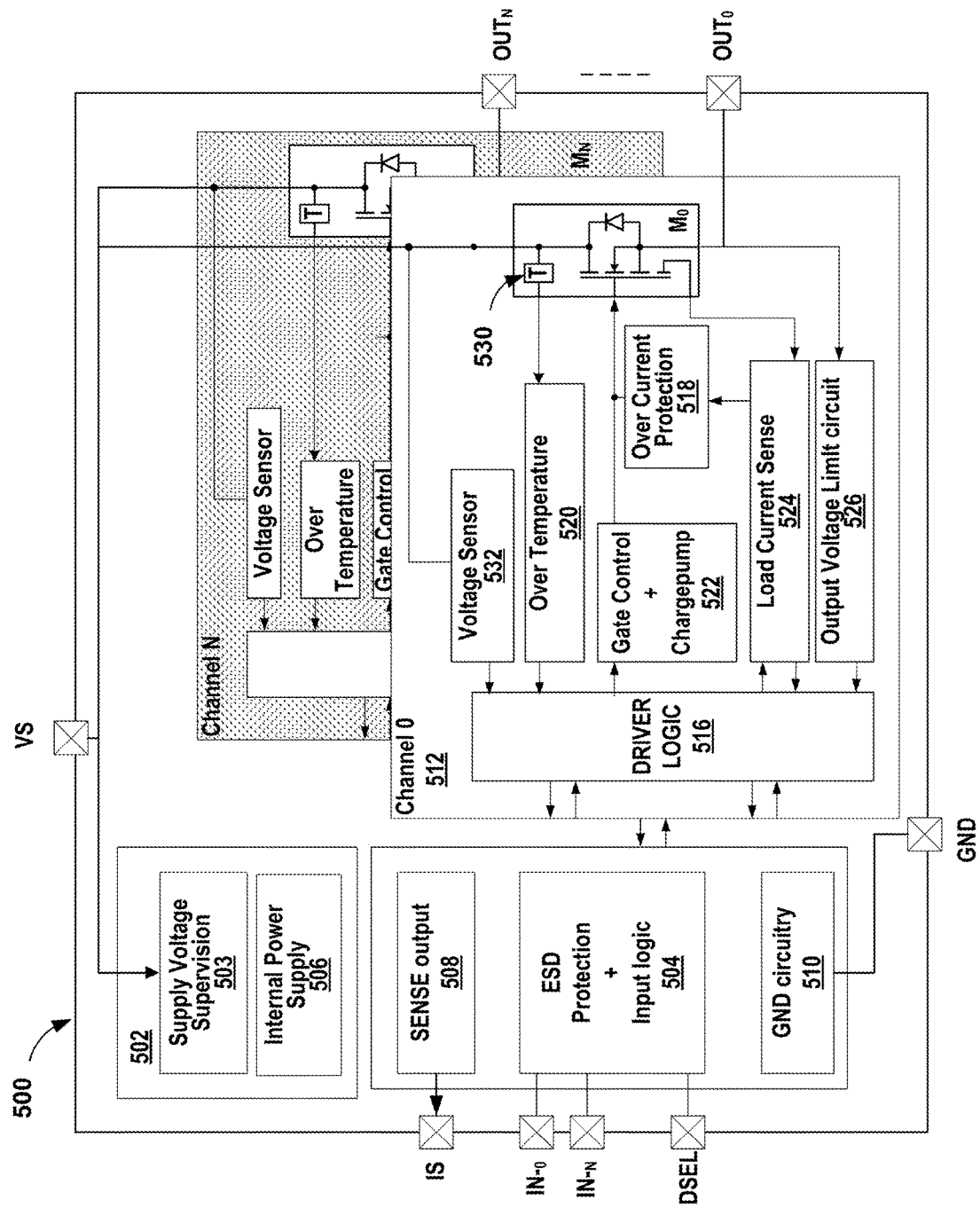
FIG. 5 is a block diagram illustrating a multichannel integrated high side switch circuit driven via individual input pins for each LED strand.

FIG. 5 is a block diagram illustrating a multichannel integrated high side switch circuit driven via individual input pins for each LED strand. LED array control circuit 500 illustrates another example of a LED array control circuit control circuit as described above in relation to FIGS. 1-4. Features and configurations of any LED array control circuit of this disclosure may be combined in any combination with the features and configurations of any of the examples of this disclosure.

As described above in the examples of FIGS. 1-4, LED array control circuit 500 includes output terminals OUT0-OUT-N, which are connected to the VS terminal through switches M0-MN. Switches M0-MN are controlled by the driver circuits for channel 0 through channel N, such as driver circuit 512 for channel 0. The example of LED array control circuit 500 also includes power supply portion 502, sense output 508, ESD protection and input logic 504, and ground circuitry 510.

Power supply portion 502 similar to power supply portion 402 described above in relation to FIG. 4. In the example of LED array control circuit 500, power supply portion 502 receives power from the VS pin, rather than a separate VDD pin. Any of the LED array control circuits of this disclosure may also include the same configuration as LED array control circuit 500. Power supply portion 502 may include a supply voltage supervision circuit 503 and an internal power supply 506. Internal power supply 506 may provide one or more voltage sources to operate the components of LED array control circuit 500.

Sense output 508 may receive and process sensed signals from the driver circuits for channels 0-N. As described above for LED array control circuits 110-410, sense output 508 may include a MUX to receive sensed current from a current sensing circuit associated with each channel, such as load current sense circuit 524. In some examples sense output 508 may received additional sensed signals, such as temperature, over current flag, over voltage flag, voltage at each output terminal and similar sensed signals. Sense output 508 may output the sensed signals to the IS terminal, which may connect to one or more processor circuits, as described above in relation to FIGS. 1-3. A processor circuit may select which channel to monitor by sending a signal through ESD protection and input logic circuit 504 via the select pin, DSEL.

As with ESD protection circuit 404 described above in relation to FIG. 4, ESD protection and input logic circuit 504 may protect the components of LED array control circuit 500 from electrostatic discharge (ESD) and other types of electromagnetic interference (EMI). As described in FIGS. 3 and 4, each input terminal $In_0$-$In_N$ may receive a separate PWM scheme that controls the current in each channel via driver circuits and switches M0-MN, such as driver circuit 512. Though not shown in FIG. 5, LED array control circuit 500 may also include a digital communication circuit that may not be connected based on the application using LED array control circuit 500. Ground circuitry 510 may include filtering or other circuits that may operate in conjunction with ESD protection and input logic circuit 504.

Driver circuit 512 is an example of the driver circuits for channels 0-N included in LED array control circuit 500. The example of driver circuit 512 includes voltage sensor 532, over temperature circuit 520 connected to temperature sensor 530, gate control and charge pump 522, over current protection circuit 518, load current sense circuit 524 and output voltage limit circuit 526. Components of driver circuit 512 may have the same function and features as components of driver circuit 412 described in relation to FIG. 4. For example, the description of gate control and charge pump circuit 422 applies to gate control and charge pump circuit 522, over-current protection circuit 418 applies to over-current protection circuit 518, overvoltage clamping circuit 426 applies to overvoltage limit circuit 526 and load current sensor circuit 424 applies to load current sensor circuit 524.

In some examples, over temperature circuit 520 functions similar to temperature sensor 420, except that the example of LED array control circuit 512 depicts a separate temperature sensor 530 included in switch M0. Over temperature circuit 520, as with temperature sensor 420, may include circuits to amplify, filter and compare signal from temperature sensor 530 to one or more thresholds.

Voltage sensor 532 may monitor the voltage at output terminal OUT 0, which may connect to a LED strand as part of a LED array. In some examples, voltage sensor 532 may be included as part of output voltage limit circuit 526.

As with driver logic 416 depicted in FIG. 4, driver logic 516 of FIG. 5 may receive input signals from the components of driver circuit 512 and adjust the current to output terminal OUT0 in response to the signals. Driver logic 516 may include circuitry to reduce the duty cycle of switch M0 in response to, for example, an over temperature signal from over temperature circuit 520 or over current protection circuit 518. In some examples, driver logic 516 may communicate with a processor circuit, e.g. via input terminal $In_0$ to receive a PWM signal to control switch M0, or via a MUX included in sense output 508 to output one or more signals from the components in driver circuit 512.

Figure 6:
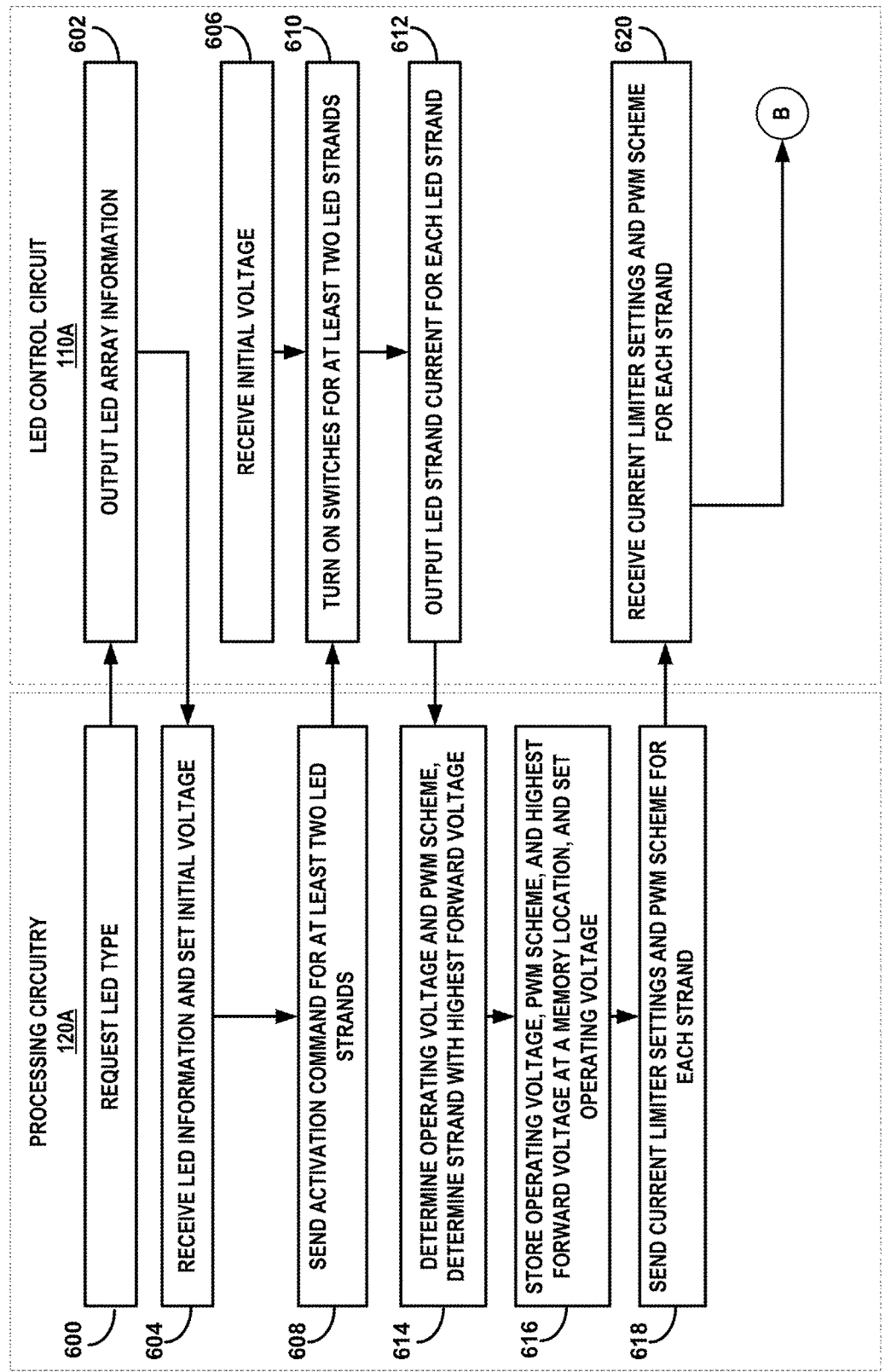
FIG. 6 is a flow chart illustrating an example technique for an initialization phase of a system for controlling a LED array, according to one or more techniques of this disclosure.

FIG. 6 is a flow chart illustrating an example technique for an initialization phase of a system for controlling a LED array, according to one or more techniques of this disclosure. The steps of FIG. 6 describe one example of an interaction between processing circuitry 120A and LED array control circuit 110A. Though the steps described in FIG. 6 may apply to any of the examples in this disclosure, for brevity, FIG. 6 will be described in terms of FIG. 1, unless otherwise noted. Processing circuity 120A functions similar to processing circuitry 120 and LED array control circuit 110A functions similar to LED array control circuit 110, as depicted in FIG. 1.

A processor circuit, such as processing circuitry 120A may determine an initial voltage for a LED array, such as LED array 160, controlled by the LED array control circuit 110A. Because LED array 160 may include a plurality of LED strands and LED strands may include LEDs of different types, processing circuitry 120A may request the LED type (600) from a digital communication circuit, e.g. digital communication circuit 215 depicted in FIG. 2. In response, digital communication circuit 215 may output the LED type, or in some examples, output a maximum startup voltage, to processing circuitry 120A (602). Processing circuitry 120A may receive the LED type, or voltage information and command power supply circuit 130 to output an initial voltage to the VS terminal of LED array control circuit 110A, as depicted in FIG. 1 (604).

In some examples, processing circuitry 120A may be configured to set an initial voltage for power supply circuit 130 without first sending a query to LED array control circuit 110A for LED information. For example, a LED array control circuit 110A may not include digital communication circuit 215, or digital communication circuit 215 may be disconnected in some applications. In still other examples, system 100 may be configured to initialize itself without query steps 600-604, for example, either processing circuitry 120A or LED array control circuit 110A may be programmed by a user during assembly with the initial starting voltage. In any of the examples, the processor circuit may activate the voltage supply circuit to output the initial voltage to the LED array via the LED array control circuit.

LED array control circuit 110A may receive the initial voltage at the VS terminal and activate at least two switches controlling at least two respective LED strands of the plurality of LED strands in LED array 160 (610). In some examples processing circuitry 120 may cause a driver logic portion of a driver circuit, e.g. driver circuit 412, to activate the switches (608). In other examples, processing circuitry 120A may directly activate the at least two switches, e.g. via input terminals $In_0$-$In_N$.

A current measurement circuit, such as load current sensor circuit 424 of FIG. 4, may output the LED strand current for each LED strand of LED array 160 (612). Processing circuitry 120 may receive a respective magnitude of current for each activated LED strand of the plurality of LED strands. In some examples, processing circuitry 120 may receive the current for each LED strand of LED array 260 via the MUX, whether or not the LED strand is one of the activated LED strands. Processing circuitry 120 may continue to cycle through each LED strand, or activated LED strand, to monitor the current throughout the initialization phase, as well as periodically during the operating phase.

Processing circuitry 120A may determine a respective magnitude of voltage for each LED strand of the plurality of LED strands. For example, voltage sensor 532 in FIG. 5, may output the voltage of output terminal OUT0. In some examples, processing circuitry 120A may receive the voltage information for each output terminal OUT0-OUT-N through sense terminal IS via the MUX, e.g. as depicted by sense output 508 or load current sense terminal 240 in FIGS. 2, 3 and 5. In other examples, processing circuitry 120A may receive the output voltage information via digital communication circuit 215, depicted in FIG. 2.

In response to receiving the respective magnitude of voltage for each LED strand, processing circuitry 120A may determine the LED strand with the highest magnitude of voltage, in relation to the remaining LED strands of the plurality of LED strands (614). In the example of LED array 160 in FIG. 1, the strand with the highest magnitude of voltage may be the strand with the largest number of LEDs, such as the LED strand connected to OUT3 or to both OUT 5 and OUT6. For example, if the LED voltage drop for each LED in the strand attached to OUT 3 is greater than the voltage drop for LEDs in the strand connected to OUT5 and OUT6, then OUT3, with four LEDs may have the highest magnitude of voltage.

In some examples, the voltage ramp portion of the initialization phase may stop when all branches have reached at least a predetermined target current. As described above in relation to FIG. 1, LED array control circuit 110A may be configured to ensure that each active output OUT0-OUT-N has approximately the same magnitude of average current. Processing circuitry 120A may determine a PWM scheme, and associated duty cycle for each switch M0-MN, such that the current for each branch (OUT0-OUT-N) is approximately equal to the current in the other branches. The voltage into the VS terminal may be therefore defined by the output voltage of the output terminal powering the LED strand with the highest forward voltage, in this example OUT3. The predetermined target current may be selectable based on the application, e.g. interior lighting, headlight, or similar application, which may include the types and number of LEDs in LED array 160.

Processing circuitry 120A may store the value of the operating voltage, the PWM scheme and the highest forward voltage at a memory location. In some examples the memory location may be integrated within processing circuitry 120, such as in the example of a microcontroller. In other examples the memory location may be separate from processing circuitry 120A. In response to determining the LED strand with the highest magnitude of voltage, processing circuitry 120A may set the voltage supply circuit, e.g. power supply 130, to output an operating voltage for the LED array (616). Once processing circuitry 120A sets the operating voltage, processing circuitry 120A may set the individual duty cycle for the PWM scheme for each driver circuit channel controlling switches M0-MN. In other words, in response to setting the operating voltage, processing circuitry 120A may determine the operating pulse width modulation (PWM) scheme for each respective switch of each respective LED strand such that magnitude of current in each LED strand is approximately a predetermined magnitude of current. Each respective PWM scheme for each respective switch M0-MN may be set independently of the remaining switches.

In some examples, processing circuitry 120A may send current limiter settings for over-current protection circuits, e.g. over-current protection circuit 418 and over-current protection circuit 518 depicted in FIGS. 4 and 5, via digital communication circuits, such as digital communication circuits 215 and 415 (618). The digital communication circuit may set the current limit in each respective over-current protection circuit for each channel. The digital communication circuit may also program each respective driver circuit with the PWM scheme and current limit settings (620). In some examples, the digital communication circuit may also receive other system protection limits from the processing circuitry and set those limits in the components of the driver circuits, such as over-voltage, temperature thresholds, and similar limits.

In other examples, current limits may be programmed by a user during assembly into a system. For example, a LED array control circuit for use controlling interior lighting may be programmed with expected over-current limits during the assembly and installation process, along with over-voltage, over-temperature and other safety limits. During assembly and installation, a user may understand the number and types of LEDs used for the interior lighting and may set the system protection limits based on that understanding.

Figure 7:
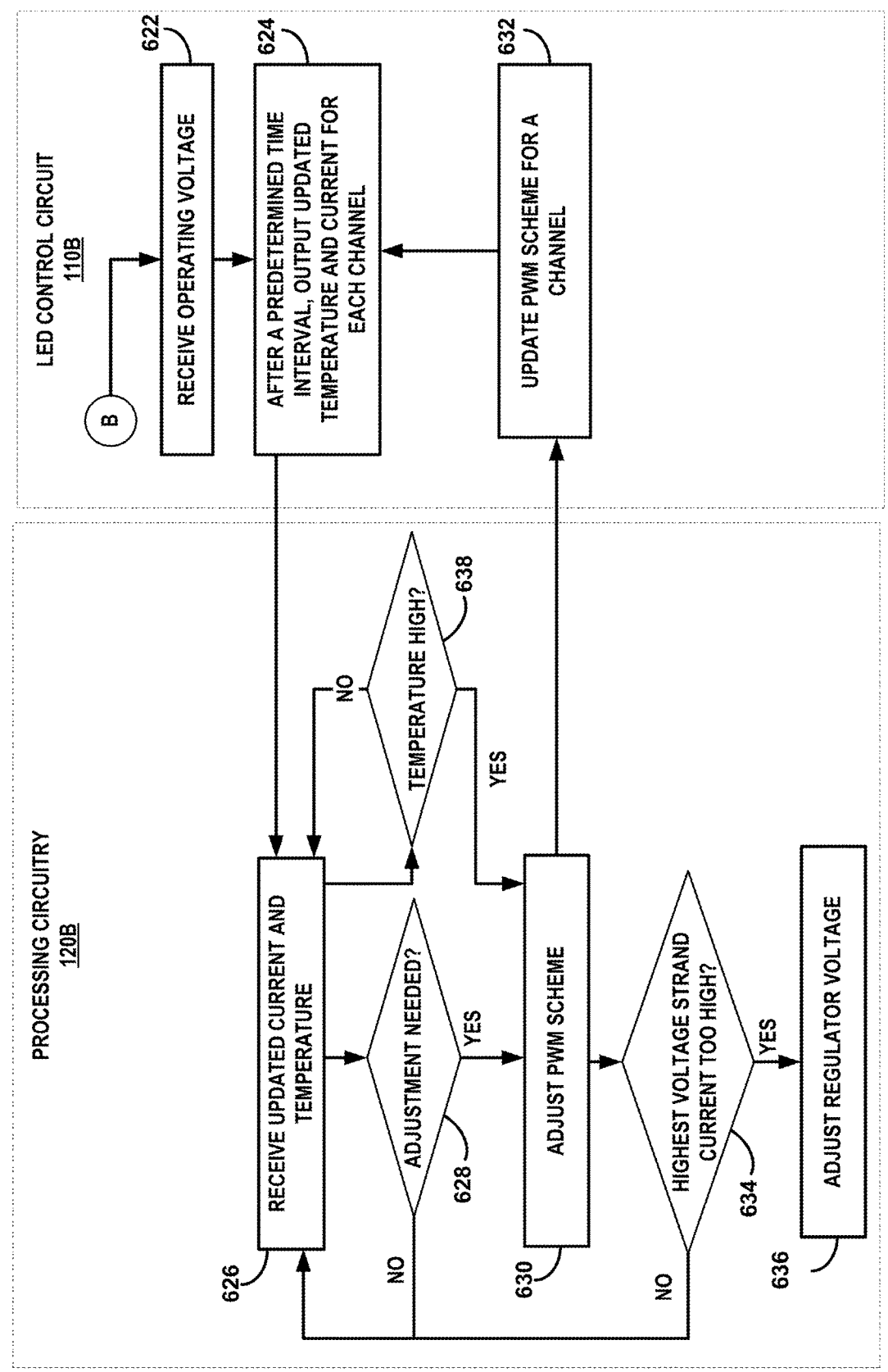
FIG. 7 is a flow chart illustrating an example technique for an operating phase of a system for controlling a LED array, according to one or more techniques of this disclosure.

FIG. 7 is a flow chart illustrating an example technique for an operating phase of a system for controlling a LED array, according to one or more techniques of this disclosure. The operating phase may begin after the initialization phase of FIG. 6 has been completed, as indicated by the "B" block in FIGS. 6 and 7. The steps of FIG. 7 will be described in terms of FIGS. 1-5 and describes one example of an interaction between processing circuitry 120B and LED array control circuit 110B. Similar to processing circuity 120A and LED array control circuit 110A described above in relation to FIG. 6, processing circuity 120B functions similar to processing circuitry 120 and LED array control circuit 110B functions similar to LED array control circuit 110, as depicted in FIG. 1.

LED array control circuit 110B may receive an operating voltage at the VS terminal from a power supply, such as voltage regulator 230 depicted in FIG. 2 (622). As described above, in relation to FIG. 6, the operating voltage may be based on the LED strand in a LED array with the highest total forward voltage. After a predetermined time interval, the LED array control circuit may out an updated temperature and magnitude of current for each channel (624). The magnitude of current may include the average current based on the duty cycle of the PWM scheme for the channel. In some examples, the digital communication circuit may determine the time interval and which channels for which to output the current and temperature information. In other examples, processing circuitry 120B may select the channels to receive the updated current and temperature information (626).

Processing circuitry 120B may determine whether the second, updated respective magnitude of current for a LED strand is within a threshold range of the predetermined magnitude of current (628). In response to determining that the updated respective magnitude of current for the LED strand exceeds the threshold range from the predetermined magnitude of current, processing circuitry 120B may adjust the respective PWM scheme for the LED strand (630), e.g. by adjusting the duty cycle of the signal controlling the gate of the switch for the channel. If processing circuitry 120B determines the magnitude of current does not exceed the current threshold (NO branch of 628), processing circuitry may make no adjustments and wait for the next set of updated current measurements.

Similarly, processing circuitry 120B may determine whether a temperature of a respective switch for a LED strand exceeds a threshold temperature (638). In response to determining that the temperature exceeds a threshold temperature, processing circuitry 120B may reduce the average current to the respective LED strand, e.g. by adjusting the duty cycle (630). In some examples, processing circuitry 120 may turn off the switch, i.e. adjust the duty cycle to zero.

LED array control circuit 110B may receive the commands to update the PWM scheme for a channel (632), either via the digital communication circuit, or direct control, such as using input terminals $In_0$-$In_N$. After a predetermined time interval, LED array control circuit 110B may out an updated temperature and magnitude of current for each channel (624). In other examples, as described above in relation to FIGS. 4 and 5, the respective driver logic may adjust the duty cycle of the respective switch for the channel based on the current, temperature or other sense information without input from processing circuitry 120B.

Processing circuitry 120B may further determine that a magnitude of current for the LED strand with the highest magnitude of voltage exceeds a threshold range of the predetermined magnitude of current (634). In other words, the current in the channel with the LED strand that has the highest total forward voltage has exceeded a current threshold. In some examples, processing circuitry 120B may adjust the PWM scheme, as described above (630). In other examples, processing circuitry 120B may determine that the current for the channel with the highest total forward voltage has exceeded a predetermined range from the current threshold and may adjust the power supply voltage (636). For example, a predetermined threshold current may be set to 100 mA for the LED array. Processing circuitry may adjust the duty cycle of the PWM scheme to increase or decrease the current for a given channel to maintain the 100 mA. The current may fluctuate based on temperature, or other factors. If the current exceeds a range from the current threshold, such as a range of ±20 mA from the 100 mA threshold (i.e. a range of 80 mA to 120 mA), processing circuitry 120B may adjust the output voltage of the power supply that is connected to the VS terminal of the LED array control circuit (636). In other words, in response to determining that the magnitude of current for the LED strand with the highest magnitude of voltage exceeds a threshold range from the predetermined magnitude of current, processing circuitry 120B may adjust the operating voltage from the voltage supply circuit to the LED array from a first operating voltage to a second operating voltage. Exceeding a range is just one example of a triggering criteria for processing circuitry 120B to adjust either the PWM scheme, or the regulator voltage. Other examples of triggering criteria may also be used. If the current for the highest voltage strand does not exceed the trigger criteria (NO of 634), processing circuitry 120B may wait for the next updated magnitude of current and other sense information (626).

In one or more examples, the functions described above may be implemented in hardware, software, firmware, or any combination thereof. For example, the various components of FIGS. 1-3, such as processing circuitry 120 and microcontroller 220 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media, may comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, microcontrollers, general purpose microprocessors, ASICs, FPGAs, or other equivalent integrated or discrete logic circuitry. Accordingly, the term "processor," as used herein, such as processing circuitry 120, microcontroller 220 and microcontroller 320, may refer to any of the foregoing structure or any other structure suitable for implementation of the techniques described herein. In addition, in some aspects, the functionality described herein may be provided within dedicated hardware and/or software modules configured for encoding and decoding. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Example 1

A light emitting diode (LED) array control circuit, the control circuit comprising: a plurality of output terminals, wherein each output terminal is configured to drive a LED strand of a LED array. The circuit further comprises a plurality of current measurement circuits, wherein each respective measurement circuit is configured to determine a magnitude of current for each respective output terminal, a plurality of switches, wherein: each switch is configured to control the magnitude of current for each respective output terminal, and each switch is configured to operate independently from any other respective switch of the plurality of switches, and a plurality of driver circuits comprising a plurality of current limiting circuits, wherein: a respective driver circuit of the plurality of driver circuits is configured to operate a respective switch of the plurality of switches each current limiting circuit of the plurality of current limiting circuits is associated with a respective switch of the plurality of switches, and each respective current limiting circuit of the plurality of current limiting circuits is configured to limit the magnitude of current for each respective output terminal to a respective predetermined current limit, wherein each respective predetermined current limit is independent from any other respective predetermined current limit.

Example 2

The control circuit of example 1, wherein the plurality of switches is configured to control the magnitude of current based on pulse width modulation (PWM).

Example 3

The control circuit of any of examples 1-2 or any combination thereof, further comprising a temperature sensor configured to protect the LED control circuit by triggering a change in a duty cycle of the PWM for one or more switches of the plurality of switches in response to a sensed temperature exceeding a temperature threshold.

Example 4

The control circuit of any combination of examples 1-3, wherein each respective switch of the plurality of switches comprises an associated temperature sensor.

Example 5

The control circuit of any combination of examples 1-4, wherein each respective driver circuit of the plurality of driver circuits further comprises an over-voltage protection circuit.

Example 6

The control circuit of any combination of examples 1-5, further comprising a digital communication circuit configured to communicate with one or more processor circuits.

Example 7

The control circuit of any combination of examples 1-6, wherein the control circuit is configured to determine a voltage at each output terminal of the plurality of output terminals.

Example 8

The control circuit of any combination of examples 1-7, further comprising a sense terminal and a multiplexor (MUX) circuit, wherein the MUX circuit is configured to receive information from each driver circuit of the plurality of driver circuits and output the information at the sense terminal, wherein the information output at the sense terminal comprises a respective magnitude of current for a respective output terminal.

Example 9

The control circuit of any combination of examples 1-8, wherein the respective current limiting circuit limits the respective magnitude of the current to be no more than a respective LED maximum current.

Example 10

The control circuit of any combination of examples 1-9, wherein the control circuit is implemented as an integrated circuit (IC).

Example 11

A method for controlling a light emitting diode (LED) array, the method comprising, initializing, by a processor circuit, a LED control circuit, wherein initialization comprises: determining, by the processor circuit, an initial voltage for a LED array controlled by the LED control circuit, wherein the LED array comprises a plurality of LED strands and wherein the LED control circuit comprises a respective switch to operate each LED strand, activating, by the processor circuit, a voltage supply circuit to output the initial voltage to the LED array, activating, by the processor circuit, at least two switches controlling at least two respective LED strands of the plurality of LED strands, receiving, by the processor circuit, a respective magnitude of current for each activated LED strand of the plurality of LED strands, and receiving, by the processor circuit, a respective magnitude of voltage for each LED strand of the plurality of LED strands. In response to receiving the respective magnitude of voltage for each LED strand, determining, by the processor circuit, the LED strand with the highest magnitude of voltage, in relation to the remaining LED strands of the plurality of LED strands. In response to determining the LED strand with the highest magnitude of voltage, setting, by the processor circuit, the voltage supply circuit to output an operating voltage to the LED array, and in response to setting the operating voltage, determining, by the processor circuit, a pulse width modulation (PWM) scheme for each respective switch of each respective LED strand such that magnitude of current in each LED strand is approximately a predetermined magnitude of current, wherein each respective PWM scheme for each respective switch is set independently of the remaining switches of the plurality of switches.

Example 12

The method of example 11, wherein the respective magnitude of current for each activated LED strand is a first respective magnitude of current for each activated LED strand, the method further comprising operating the LED array, wherein operating the LED array comprises receiving, by the processor circuit, a second respective magnitude of current for each activated LED strand of the plurality of LED strands, determining, by the processor circuit, whether the second respective magnitude of current for a first LED strand is within a threshold range of the predetermined magnitude of current, and in response to determining that the second respective magnitude of current for the first LED strand exceeds the threshold range from the predetermined magnitude of current, adjusting, by the processor circuit, the respective PWM scheme for the first LED strand.

Example 13

The method of any combination of examples 11-12, further comprising operating the LED array, wherein operating the LED array comprises: determining, by the processor circuit, that a magnitude of current for the LED strand with the highest magnitude of voltage exceeds a threshold range of the predetermined magnitude of current; and in response to determining that the magnitude of current for the LED strand with the highest magnitude of voltage exceeds the threshold range from the predetermined magnitude of current, adjusting, by the processor circuit, the operating voltage from the voltage supply circuit to the LED array from a first operating voltage to a second operating voltage.

Example 14

The method of any combination of examples 11-13, further comprising: determining whether a temperature of a respective switch for a LED strand exceeds a threshold temperature, and in response to determining that the temperature exceeds a threshold temperature, reducing an average current to the respective LED strand.

Example 15

The method of any combination of examples 11-14, wherein determining whether the temperature of a respective switch for a LED strand exceeds the threshold temperature comprises determining, by the processor circuit, that the temperature exceeds a threshold temperature, and in response to determining that the temperature exceeds a threshold temperature, reducing, by the processor circuit, the average current to the respective LED strand.

Example 16

A system comprising: a light emitting diode (LED) array comprising a plurality of LED strands a LED control circuit operatively coupled to the LED array, a processor circuit operatively coupled to the LED control circuit, wherein the LED control circuit comprises: a plurality of output terminals, wherein each output terminal is configured to drive respective LED strand of a LED array, a plurality of current measurement circuits, wherein each respective measurement circuit is configured to determine a magnitude of current for each respective output terminal, a plurality of switches, wherein: each switch is configured to control the magnitude of current for each respective output terminal, and each switch is configured to operate independently from any other respective switch of the plurality of switches. The LED control circuit further comprises a plurality of driver circuits comprising a plurality of current limiting circuits, wherein: a respective driver circuit of the plurality of driver circuits is configured to operate a respective switch of the plurality of switches each current limiting circuit of the plurality of current limiting circuits is associated with a respective switch of the plurality of switches, and each respective current limiting circuit of the plurality of current limiting circuits is configured to limit the magnitude of current for each respective output terminal to a respective predetermined current limit, wherein each respective predetermined current limit is independent from any other respective predetermined current limit.

Example 17

The system of example 16, wherein each respective driver circuit comprises the respective current measurement circuit, wherein the LED control circuit further comprises a sense terminal and a multiplexor (MUX) circuit, wherein the MUX circuit is configured to receive information from each driver circuit of the plurality of driver circuits and output the information at the sense terminal, wherein the information output at the sense terminal comprises a respective magnitude of current for a respective output terminal; and wherein the processor circuit is configured to receive the information output from the sense terminal.

Example 18

The system of any combination of examples 16-17, the system further comprising a power supply circuit configured to supply power to the LED array, wherein the processor circuit is configured to: activate the power supply circuit to output a first voltage to the LED array, activate at least two switches controlling at least two respective output terminals of the plurality of output terminals, receive from the sense terminal, a respective magnitude of current for each activated LED strand of the plurality of LED strands, receive a respective magnitude of voltage for each LED strand of the plurality of LED strands, in response to receiving the respective magnitude of voltage for each LED strand, determine the LED strand with the highest magnitude of voltage, in relation to the remaining LED strands of the plurality of LED strands, in response to determining the LED strand with the highest magnitude of voltage, set the voltage supply circuit to output a second voltage to the LED array, and in response to setting the second voltage, determine a pulse width modulation (PWM) scheme for each respective switch of each respective LED strand such that magnitude of current in each LED strand is approximately a predetermined magnitude of current, wherein each respective PWM scheme for each respective switch is set independently of the remaining switches of the plurality of switches.

Example 19

The system of any combination of examples 16-18, wherein the respective magnitude of current for each activated LED strand is a first respective magnitude of current for each activated LED strand, and wherein the processor circuit is further configured to: receive a second respective magnitude of current for each activated LED strand of the plurality of LED strands, determine whether the second respective magnitude of current for a first LED strand is within a threshold range of the predetermined magnitude of current; and in response to determining that the second respective magnitude of current for the first LED strand exceeds the threshold range from the predetermined magnitude of current, adjust the respective PWM scheme for the first LED strand.

Example 20

The system of any combination of examples 16-19, wherein the processor circuit is further configured to: receive a signal from the LED control circuit comprising the temperature of a respective switch for a LED strand, determine whether the temperature exceeds a threshold temperature; and in response to determining that the temperature exceeds a threshold temperature, send a signal to the LED control circuit to adjust a duty cycle of the respective switch for the respective LED strand.

Various examples of the disclosure have been described. These and other examples are within the scope of the following claims.

The invention claimed is:

1. A light emitting diode (LED) array control circuit, the control circuit comprising:
 a plurality of output terminals, wherein:
  a first output terminal and a second output terminal of the plurality of output terminals are configured to drive a first LED strand of a LED array,
  a third output terminal of the plurality of output terminals is configured to drive a second LED strand of the LED array, wherein the second LED strand consists of a first number of LEDs, and
  a fourth output terminal of the plurality of output terminals is configured to drive a third LED strand of the LED array, wherein the third LED strand consists of a second number of LEDs different than the first number of LEDs;
 a plurality of current measurement circuits, wherein each respective measurement circuit is configured to determine a magnitude of current for each respective output terminal;
 a plurality of temperature sensors;
 a plurality of switches, wherein:
  each respective switch of the plurality of switches includes a respective associated temperature sensor of the plurality of temperature sensors,
  each switch is configured to control the magnitude of current for each respective output terminal, and
  each switch is configured to operate independently from any other respective switch of the plurality of switches; and
 a plurality of driver circuits comprising a plurality of current limiting circuits, wherein:
  a respective driver circuit of the plurality of driver circuits is configured to operate a respective switch of the plurality of switches, and comprises an over-voltage protection circuit and an over-current-protection circuit,
  each current limiting circuit of the plurality of current limiting circuits is associated with a respective switch of the plurality of switches, and
  each respective current limiting circuit of the plurality of current limiting circuits is configured to adjust operation of the respective switch associated with the respective current limiting circuit so as to limit the magnitude of current for each respective output terminal.

2. The control circuit of claim 1, wherein the plurality of switches is configured to control the magnitude of current based on pulse width modulation (PWM).

3. The control circuit of claim 2, wherein each respective temperature sensor is configured to protect the LED control circuit by triggering a change in a duty cycle of the PWM for one or more switches of the plurality of switches in response to a sensed temperature exceeding a temperature threshold.

4. The control circuit of claim 1 further comprising a digital communication circuit configured to communicate with one or more processor circuits.

5. The control circuit of claim 1, wherein the control circuit is configured to determine a voltage at each output terminal of the plurality of output terminals.

6. The control circuit of claim 1, further comprising a sense terminal and a multiplexor (MUX) circuit, wherein the MUX circuit is configured to receive information from each driver circuit of the plurality of driver circuits and output the information at the sense terminal, wherein the information output at the sense terminal comprises a respective magnitude of current for a respective output terminal.

7. The control circuit of claim 6, wherein the respective current limiting circuit limits the respective magnitude of the current to be no more than a respective LED maximum current.

8. The control circuit of claim 1, wherein the control circuit is implemented as an integrated circuit (IC).

9. A method for controlling a light emitting diode (LED) array, the method comprising, initializing, by a processor circuit, a LED control circuit, wherein initialization comprises:
 determining, by the processor circuit, an initial voltage for a LED array controlled by the LED control circuit:
  wherein the LED array comprises a plurality of LED strands,
  wherein the LED control circuit comprises a respective switch to operate each LED strand, and wherein each respective switch includes a respective associated temperature sensor, an over-voltage protection circuit and an over-current-protection circuit;

activating, by the processor circuit, a voltage supply circuit to output the initial voltage to the LED array;

simultaneously activating, by the processor circuit, at least two switches controlling at least two respective LED strands of the plurality of LED strands;

receiving, by the processor circuit, a respective magnitude of current for each activated LED strand of the plurality of LED strands;

receiving, by the processor circuit, a respective magnitude of voltage for each LED strand of the plurality of LED strands;

in response to receiving the respective magnitude of voltage for each LED strand, determining, by the processor circuit, the LED strand with the highest magnitude of voltage, in relation to remaining LED strands of the plurality of LED strands;

in response to determining the LED strand with the highest magnitude of voltage, setting, by the processor circuit, the voltage supply circuit to output an operating voltage to the LED array; and in response to setting the operating voltage, determining, by the processor circuit, a pulse width modulation (PWM) scheme for each respective switch of each respective LED strand such that magnitude of current in each LED strand is approximately a predetermined magnitude of current, wherein each respective PWM scheme for each respective switch is set independently of all other switches of the plurality of switches.

10. The method of claim 9, wherein the respective magnitude of current for each activated LED strand is a first respective magnitude of current for each activated LED strand, the method further comprising operating the LED array, wherein operating the LED array comprises:

receiving, by the processor circuit, a second respective magnitude of current for each activated LED strand of the plurality of LED strands;

determining, by the processor circuit, whether the second respective magnitude of current for a first LED strand is within a threshold range of the predetermined magnitude of current; and in response to determining that the second respective magnitude of current for the first LED strand exceeds the threshold range from the predetermined magnitude of current, adjusting, by the processor circuit, the respective PWM scheme for the first LED strand.

11. The method of claim 9, further comprising operating the LED array, wherein operating the LED array comprises:

determining, by the processor circuit, that a magnitude of current for the LED strand with a highest magnitude of voltage exceeds a threshold range of the predetermined magnitude of current; and in response to determining that the magnitude of current for the LED strand with the highest magnitude of voltage exceeds the threshold range from the predetermined magnitude of current, adjusting, by the processor circuit, the operating voltage from the voltage supply circuit to the LED array from a first operating voltage to a second operating voltage.

12. The method of claim 9, further comprising:

determining whether a temperature of a respective switch for a LED strand exceeds a threshold temperature based on the associated respective temperature sensor; and in response to determining that the temperature exceeds a threshold temperature, reducing an average current to the respective LED strand.

13. The method of claim 12, wherein:

determining whether the temperature of a respective switch for a LED strand exceeds the threshold temperature comprises determining, by the processor circuit, that the temperature exceeds a threshold temperature; and in response to determining that the temperature exceeds a threshold temperature, reducing, by the processor circuit, the average current to the respective LED strand.

14. A system comprising:

a light emitting diode (LED) array comprising a plurality of LED strands;

a LED control circuit operatively coupled to the LED array;

a processor circuit operatively coupled to the LED control circuit, wherein the LED control circuit comprises:
    a plurality of temperature sensors;
    a plurality of output terminals, wherein:
        a first output terminal and a second output terminal of the plurality of output terminals are configured to drive a first LED strand of a LED array,
        a third output terminal of the plurality of output terminals is configured to drive a second LED strand of the LED array, wherein the second LED strand consists of a first number of LEDs, and
        a fourth output terminal of the plurality of output terminals is configured to drive a third LED strand of the LED array, wherein the third LED strand consists of a second number of LEDs different than the first number of LEDs;
    a plurality of current measurement circuits, wherein each respective measurement circuit is configured to determine a magnitude of current for each respective output terminal;
    a plurality of switches, wherein:
    each respective switch of the plurality of switches includes a respective associated temperature sensor of the plurality of temperature sensors,
    each switch is configured to control the magnitude of current for each respective output terminal, and
    each switch is configured to operate independently from any other respective switch of the plurality of switches; and
    a plurality of driver circuits comprising a plurality of current limiting circuits, wherein:
        a respective driver circuit of the plurality of driver circuits is configured to operate a respective switch of the plurality of switches, and comprises an over-voltage protection circuit and an over-current-protection circuit,
        each current limiting circuit of the plurality of current limiting circuits is associated with a respective switch of the plurality of switches, and
        each respective current limiting circuit of the plurality of current limiting circuits is configured to adjust operation of the respective switch associated with the respective current limiting circuit so as to limit the magnitude of current for each respective output terminal.

15. The system of claim 14:

wherein each respective driver circuit comprises the respective current measurement circuit;

wherein the LED control circuit further comprises a sense terminal and a multiplexor (MUX) circuit, wherein the MUX circuit is configured to receive information from each driver circuit of the plurality of driver circuits and output the information at the sense terminal, wherein the information output at the sense terminal comprises a respective magnitude of current for a respective output terminal; and wherein the processor circuit is configured to receive the information output from the sense terminal.

16. The system of claim 15, the system further comprising a power supply circuit configured to supply power to the LED array, wherein the processor circuit is configured to:
activate the power supply circuit to output a first voltage to the LED array;
activate at least two switches controlling at least two respective output terminals of the plurality of output terminals;
receive from the sense terminal, a respective magnitude of current for each activated LED strand of the plurality of LED strands;
receive a respective magnitude of voltage for each LED strand of the plurality of LED strands;
in response to receiving the respective magnitude of voltage for each LED strand, determine the LED strand with a highest magnitude of voltage, in relation to remaining LED strands of the plurality of LED strands;
in response to determining the LED strand with the highest magnitude of voltage, set the power supply circuit to output a second voltage to the LED array; and
in response to setting the second voltage, determine a pulse width modulation (PWM) scheme for each respective switch of each respective LED strand such that magnitude of current in each LED strand is approximately a predetermined magnitude of current, wherein each respective PWM scheme for each respective switch is set independently of all other switches of the plurality of switches.

17. The system of claim 16, wherein the respective magnitude of current for each activated LED strand is a first respective magnitude of current for each activated LED strand, and wherein the processor circuit is further configured to:
receive a second respective magnitude of current for each activated LED strand of the plurality of LED strands;
determine whether the second respective magnitude of current for a first LED strand is within a threshold range of the predetermined magnitude of current; and
in response to determining that the second respective magnitude of current for the first LED strand exceeds the threshold range from the predetermined magnitude of current, adjust the respective PWM scheme for the first LED strand.

18. The system of claim 14, wherein the processor circuit is further configured to:
receive a signal from the LED control circuit comprising a temperature of a respective switch for a LED strand, based on the associated respective temperature sensor;
determine whether the temperature exceeds a threshold temperature; and
in response to determining that the temperature exceeds a threshold temperature, send a signal to the LED control circuit to adjust a duty cycle of the respective switch for the respective LED strand.

* * * * *